(12) United States Patent
Takano et al.

(10) Patent No.: US 8,114,942 B2
(45) Date of Patent: Feb. 14, 2012

(54) PROCESS FOR PRODUCING CYCLOOLEFIN RESIN COMPOSITION, AND CYCLOOLEFIN RESIN COMPOSITION

(75) Inventors: Yasuhiro Takano, Otake (JP); Masato Kawamura, Iwakuni (JP); Kenji Doi, Otake (JP); Noritsuna Saito, Iwakuni (JP); Masaaki Ogizawa, Hatsukaichi (JP); Atsushi Shibuya, Funabashi (JP); Toshiyuki Hirose, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 11/988,004

(22) PCT Filed: Dec. 21, 2005

(86) PCT No.: PCT/JP2005/023541
§ 371 (c)(1),
(2), (4) Date: Dec. 28, 2007

(87) PCT Pub. No.: WO2007/004321
PCT Pub. Date: Jan. 11, 2007

(65) Prior Publication Data
US 2009/0176940 A1    Jul. 9, 2009

(30) Foreign Application Priority Data

Jun. 30, 2005 (JP) .................. 2005-191283

(51) Int. Cl.
*C08F 277/00* (2006.01)
*C08F 232/00* (2006.01)
(52) U.S. Cl. ...................... 525/297; 525/256
(58) Field of Classification Search .................. 525/320, 525/256, 297
See application file for complete search history.

(56) References Cited

U.S. PATENT DOCUMENTS

| | | | | |
|---|---|---|---|---|
| 5,128,446 A | * | 7/1992 | Hayashi et al. | 528/501 |
| 6,232,407 B1 | * | 5/2001 | Hashidzume et al. | 525/331.7 |
| 6,486,264 B1 | * | 11/2002 | Tsunogae et al. | 525/339 |

FOREIGN PATENT DOCUMENTS

| | | |
|---|---|---|
| EP | 0 358 516 A2 | 3/1990 |
| EP | 0 964 005 A1 | 12/1999 |
| JP | 61-221206 A | 10/1986 |
| JP | 63-023102 A | 1/1988 |
| JP | 64-000106 A | 1/1989 |
| JP | 02-173112 A | 7/1990 |
| JP | 04-170456 A | 6/1992 |
| JP | 11-130842 | 5/1999 |
| JP | 2000-38414 A | 2/2000 |
| JP | 2000-63425 A | 2/2000 |
| JP | 2001-106730 | 4/2001 |
| JP | 2001-316455 A | 11/2001 |
| JP | 2002-069122 A | 3/2002 |
| JP | 2002069122 A * | 3/2002 |
| JP | 2002-105131 A | 4/2002 |
| JP | 2002105131 A * | 4/2002 |
| JP | 2003-311737 A | 11/2003 |
| JP | 2003-311773 A | 11/2003 |
| JP | 2003311737 A * | 11/2003 |
| JP | 2006-022266 A | 1/2006 |

OTHER PUBLICATIONS

English machine translation of JP 2002-069122 A, Ueno et al, Mar. 8, 2002.*
Information Offer received in corresponding Japanese Patent Application No. 2005-191283 dated Dec. 1, 2009.
Extended Search Report from European Patent Office issued in corresponding European Patent Application No. 05819467.8 dated Jan. 11, 2011.

* cited by examiner

*Primary Examiner* — Mark Eashoo
*Assistant Examiner* — David Karst
(74) *Attorney, Agent, or Firm* — Buchanan Ingersoll & Rooney PC

(57) ABSTRACT

Provided is a process for producing a cycloolefin resin composition, comprising a step of hydrogenating a resin composition. The resin composition before hydrogenation, which is used in the above step, includes 0.01 to 20 parts by weight of an unsaturated hydrocarbon compound having a boiling point of 50° C. or higher, for example, a monomer employed in polymerization, per 100 parts by weight of the resin composition.

8 Claims, No Drawings

PROCESS FOR PRODUCING CYCLOOLEFIN RESIN COMPOSITION, AND CYCLOOLEFIN RESIN COMPOSITION

TECHNICAL FIELD

The present invention relates to a process for producing a cycloolefin resin composition, and to a cycloolefin resin composition.

BACKGROUND ART

In recent years, there has been continuously investigated to employ a transparent plastic injection molding lens instead of conventional glass grinding lenses, for optical lenses such as pickup-lenses for an optical disc optical system, collimator lenses, or various lenses for capturing small image so as to improve productivity and to produce light-weight products.

However, if the plastics are amorphous resins with a higher performance, they may be insufficient in transferability during molding, and as a result, there occurs a problem in molding, such as coloring during retention at a high temperature.

In order to solve such problem, for example, Japanese Unexamined Patent Application Publication No. 2003-311773 discloses improvement in the conditions for molding. Otherwise, as disclosed in Japanese Unexamined Patent Application Publication Nos. 2003-311737 and 2002-105131, handling of a material to be used, the material itself, or the like has been devised, but the results did not demonstrate sufficient improvement. Therefore, there is still a need of materials which can be easily molded in all the aspects.

[Patent Document 1] Japanese Unexamined Patent Application Publication No. 2003-311773
[Patent Document 2] Japanese Unexamined Patent Application Publication No. 2003-311737
[Patent Document 3] Japanese Unexamined Patent Application Publication No. 2002-105131

DISCLOSURE OF THE INVENTION

It is an object of the present invention to provide a process for producing a cycloolefin resin composition which improves the poor appearance derived from insufficient transferability during molding (so-called flowability at a molding), which exhibits inhibited coloring derived from thermal history caused by retention at a high temperature, or the like, and which can be easily molded, and a cycloolefin resin composition.

The present inventors have made extensive studies in order to solve the above-described problems, and as a result, they have found that a cycloolefin resin composition which improves the poor appearance derived from insufficient transferability during molding (so-called flowability at a molding), which exhibits inhibited coloring derived from thermal history caused by retention at a high temperature or the like, and which can be easily molded, is obtained, by hydrogenating a cycloolefin resin composition including a specific amount of an unsaturated hydrocarbon compound in the presence of a hydrogenation catalyst. Thus, the present inventors have completed the present invention.

Specifically, the present invention provides processes for producing a cycloolefin resin composition as described in following [1] to [10]; cycloolefin resin compositions as described in following [11] to [13]; and a molded product as described in following [14].

[1] A process for producing a cycloolefin resin composition (B), including:
preparing a cycloolefin resin composition (A) including a cycloolefin polymer having one or two or more kinds of the structures represented by the general formula (1):

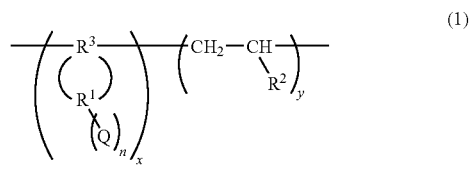

(wherein x and y each represent a copolymerization ratio, and are each a real number satisfying $0/100 \leq y/x \leq 95/5$, with x and y being presented on a molar basis, n represents the number of a substituent Q, and is an integer satisfying $0 \leq n \leq 2$, $R^1$ is a (2+n)-valent group selected from the group consisting of hydrocarbon groups having 2 to 20 carbon atoms, and a plurality of $R^1$'s, if any, may be the same as or different from each other, $R^2$ is a hydrogen atom or a mono-valent group selected from the group consisting of a hydrocarbon group having 1 to 10 carbon atoms composed of carbon and hydrogen, and a plurality of $R^2$'s, if any, may be the same as or different from each other, $R^3$ is a tetra-valent group selected from the group consisting of hydrocarbon groups having 2 to 10 carbon atoms, and a plurality of $R^3$'s, if any, may be the same as or different from each other, and Q is represented by $COOR^4$ (in which $R^4$ is a hydrogen atom or a mono-valent group selected from the group consisting of a hydrocarbon group having 1 to 10 carbon atoms composed of carbon and hydrogen), and a plurality of Q's, if any, may be the same as or different from each other), and an unsaturated hydrocarbon compound having a boiling point of 50° C. or higher; and hydrogenating at least the unsaturated hydrocarbon compound in the resin composition (A) in the presence of a hydrogenation catalyst, wherein the cycloolefin resin composition (A) includes 0.01 to 20 parts by weight of the unsaturated hydrocarbon compound, per 100 parts by weight of the resin composition.

[2] The process for producing a cycloolefin resin composition (B) as described in [1], wherein the cycloolefin polymer is represented by the general formula (2):

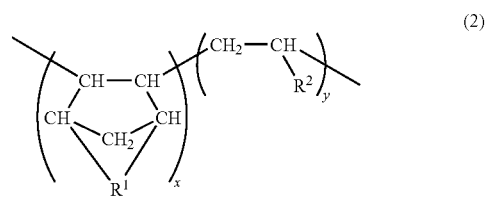

(wherein $R^1$ is a (2+n)-valent group selected from the group consisting of hydrocarbon groups having 2 to 20 carbon atoms, and a plurality of $R^1$'s, if any, may be the same as or different from each other, $R^2$ is a hydrogen atom or a mono-valent group selected from the group consisting of a hydrocarbon group having 1 to 5 carbon atoms, and a plurality of $R^2$'s, if any, may be the same as or different from each other, and x and y each represent a copolymerization ratio, and are each a real number satisfying 5/95≦y/x≦95/5, with x and y being presented on a molar basis).

[3] The process for producing a cycloolefin resin composition (B) as described in [1] or [2], wherein the unsaturated hydrocarbon compound is a monomer employed in the production of a cycloolefin polymer.

[4] The process for producing a cycloolefin resin composition (B) as described in any one of [1] to [3], wherein the cycloolefin resin composition (A) is a solution which the cycloolefin polymer and the unsaturated hydrocarbon compound are dissolved in a hydrocarbon solvent.

[5] The process for producing a cycloolefin resin composition (B) as described in any one of [1] to [4], wherein the hydrogenating the unsaturated hydrocarbon compound includes passing the cycloolefin resin composition (A) through a fixed bed reactor containing a hydrogenation catalyst, to hydrogenate at least the unsaturated hydrocarbon compound.

[6] The process for producing a cycloolefin resin composition (B) as described in any one of [1] to [5], further containing treating the resin composition (A) with an adsorbent before and/or after the hydrogenating the unsaturated hydrocarbon compound.

[7] The process for producing a cycloolefin resin composition (B) as described in any one of [1] to [6], further containing removing a part of the unsaturated hydrocarbon compound from the resin composition (A) before the hydrogenating the unsaturated hydrocarbon compound.

[8] A process for producing a cycloolefin resin composition (C), containing drying the cycloolefin resin composition (B) obtained by the process as described in any one of [1] to [7] to remove at least the solvent from the cycloolefin resin composition (B) including the cycloolefin polymer, the saturated hydrocarbon compound having a boiling point of 50° C. or higher, and the solvent.

[9] The process for producing a cycloolefin resin composition (C) as described in [8], wherein the removing the solvent includes removing the solvent and a part of the saturated hydrocarbon compound from the cycloolefin resin composition (B) to give a content of the saturated hydrocarbon compound of 0.01 to 10 parts by weight, per 100 parts by weight of the cycloolefin polymer.

[10] The process for producing a cycloolefin resin composition (C) as described in [8] or [9], wherein the removing the solvent includes flash-drying the cycloolefin resin composition (B) at a temperature at which no solidification of the cycloolefin polymer will take place, in a double pipe flash drying method.

[11] A cycloolefin resin composition (C) including: a cycloolefin polymer having one or two or more kinds of the structures represented by the general formula (4):

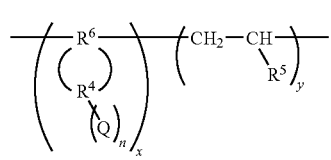

(wherein x and y each represent a copolymerization ratio, and are each a real number satisfying 0/100≦y/x≦95/5, with x and y being presented on a molar basis, n represents the number of a substituent Q, and is an integer satisfying 0≦n≦2, $R^4$ is a (2+n)-valent group selected from the group consisting of hydrocarbon groups having 2 to 20 carbon atoms, and a plurality of $R^4$'s, if any, may be the same as or different from each other, $R^5$ is a hydrogen atom or a mono-valent group selected from the group consisting of a hydrocarbon group having 1 to 10 carbon atoms composed of carbon and hydrogen, and a plurality of $R^5$'s, if any, may be the same as or different from each other, $R^6$ is a tetra-valent group selected from the group consisting of hydrocarbon groups having 2 to 10 carbon atoms, and a plurality of $R^6$'s, if any, may be the same as or different from each other, and Q is represented by $COOR^7$ (in which $R^7$ is a hydrogen atom or a mono-valent group selected from the group consisting of a hydrocarbon group having 1 to 10 carbon atoms composed of carbon and hydrogen), and a plurality of Q's, if any, may be the same as or different from each other), and a saturated hydrocarbon compound having a boiling point of 50° C. or higher wherein the resin composition (C) includes 0.01 to 10 parts by weight of the saturated hydrocarbon compound, per 100 parts by weight of the cycloolefin polymer (C).

[12] The cycloolefin resin composition (C) as described in [10], wherein the cycloolefin polymer is a cycloolefin copolymer represented by the general formula (5):

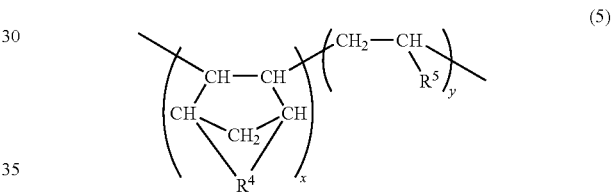

(wherein $R^4$ is a (2+n)-valent group selected from the group consisting of hydrocarbon groups having 2 to 20 carbon atoms, and a plurality of $R^4$'s, if any, may be the same as or different from each other, $R^5$ is a hydrogen atom or a mono-valent group selected from the group consisting of a hydrocarbon group having 1 to 5 carbon atoms, and a plurality of $R^5$'s, if any, may be the same as or different from each other, and x and y each represent a copolymerization ratio, and are each a real number satisfying 5/95≦y/x≦95/5, with x and y being presented on a molar basis).

[13] The cycloolefin resin composition (C) as described in [11] or [12], wherein the saturated hydrocarbon compound is a hydrogenation product of the monomers employed in the production of the cycloolefin polymer.

[14] A cycloolefin resin composition (C) obtained by the process for producing a cycloolefin resin composition as described in any one of [8] to [10].

[15] A molded product obtained by molding the cycloolefin resin composition (C) as described in any one of [11] to [14].

According to the process for producing a cycloolefin resin composition of the present invention, a cycloolefin resin composition which improves the poor appearance derived from insufficient transferability during molding, which is so-called flowability at a molding, which exhibits inhibited coloring derived from thermal history caused by retention at a high temperature or the like, and which can be easily molded, can be obtained easily and efficiently. Thus, the present invention is industrially valuable.

BEST MODE FOR CARRYING OUT THE INVENTION

The process for producing a cycloolefin resin composition (B) of the present invention includes the steps of preparing a cycloolefin resin composition (A) including a cycloolefin polymer having one or two or more kinds of the structures represented by the following general formula (1), and an unsaturated hydrocarbon compound having a boiling point of 50° C. or higher; and hydrogenating at least the unsaturated hydrocarbon compound in the resin composition (A) in the presence of a hydrogenation catalyst. In the hydrogenation step, the cycloolefin resin composition (A) includes 0.01 to 20 parts by weight of the unsaturated hydrocarbon compound, per 100 parts by weight of the resin composition (A).

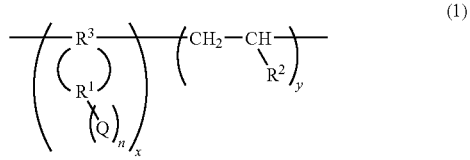

(1)

(wherein x and y each represent a copolymerization ratio, and are each a real number satisfying $0/100 \leq y/x \leq 95/5$, with x and y being presented on a molar basis, n represents the number of a substituent Q, and is an integer satisfying $0 \leq n \leq 2$, $R^1$ is a (2+n)-valent group selected from the group consisting of hydrocarbon groups having 2 to 20 carbon atoms, and a plurality of $R^1$'s, if any, may be the same as or different from each other, $R^2$ is a hydrogen atom or a mono-valent group selected from the group consisting of a hydrocarbon group having 1 to 10 carbon atoms composed of carbon and hydrogen, and a plurality of $R^2$'s, if any, may be the same as or different from each other, $R^3$ is a tetra-valent group selected from the group consisting of hydrocarbon groups having 2 to 10 carbon atoms, and a plurality of $R^3$'s, if any, may be the same as or different from each other, and Q is represented by $COOR^4$ (in which $R^4$ is a hydrogen atom or a mono-valent group selected from the group consisting of a hydrocarbon group having 1 to 10 carbon atoms composed of carbon and hydrogen), and a plurality of Q's, if any, may be the same as or different from each other)

Further, in the following description, the cycloolefin resin composition before hydrogenation of the unsaturated hydrocarbon compound is referred to as "cycloolefin resin composition (A)"; the cycloolefin resin composition after hydrogenation of the unsaturated hydrocarbon compound is referred to as "cycloolefin resin composition (B)"; and the cycloolefin resin composition obtained by removing the organic solvent, and if desired, the saturated hydrocarbon produced by hydrogenating the unsaturated hydrocarbon from the cycloolefin resin composition (B) is referred to "cycloolefin resin composition (C)".

<Cycloolefin Resin Composition (A)>

The cycloolefin resin composition (A) includes 0.01 to 20 parts by weight, preferably 3 to 15 parts by weight of an unsaturated hydrocarbon compound having a boiling point of 50° C. or higher, per 100 parts by weight of the resin composition (A).

Further, the cycloolefin resin composition (A) contains a cycloolefin polymer, an unsaturated hydrocarbon compound, and a solvent.

In addition, it is preferable that the cycloolefin resin composition (A) includes 0.01 to 200 parts by weight, preferably 3 to 150 parts by weight of the unsaturated hydrocarbon compound, per 100 parts by weight of the cycloolefin polymer.

Since the cycloolefin resin composition (A) includes the unsaturated hydrocarbon compound within the above-above range, the unsaturated hydrocarbon compound can be more easily hydrogenated. Thus, a desired cycloolefin resin composition (C) can efficiently obtained.

Further, in the present invention, a part of unreacted monomers (unsaturated hydrocarbon compound) contained in the cycloolefin resin composition (A) may be removed in a known method, before the hydrogenation of the unsaturated hydrocarbon compound. The removed, unreacted monomers can be re-used in a polymerization reaction. As a result, since the amount of the unreacted monomers in the cycloolefin resin composition (A) is reduced, hydrogenation can be effected in a short time, which is preferable in an economical aspect.

If the unreacted unsaturated hydrocarbon compound is removed before hydrogenation, the amount of the unsaturated hydrocarbon compound having a boiling point of 50° C. or higher is 0.01 to 50 parts by weight, preferably 0.01 to 20 parts by weight, per 100 parts by weight of the cycloolefin polymer, although it varies depending on the amount of the monomers removed from cycloolefin resin composition (A).

Further, the concentration of the cycloolefin polymer in the resin composition (A) is usually 2 to 40% by weight, preferably 5 to 30% by weight. The viscosity of the resin composition (A) in a solution state according to the present invention is preferably 1,000 cp or less, more preferably 100 cp or less.

As used herein, the unsaturated hydrocarbon compound refers to a monomer as a raw material employed in the production of the above-mentioned cycloolefin polymer, or a compound produced therefrom. Specific examples of the unsaturated hydrocarbon compound include norbornene and a derivative thereof, tetracyclododecene and a derivative thereof, and a compound produced by a retro-Diels-Alder reaction and a subsequent Diels-Alder reaction of the compounds as mentioned herein, and specifically a monomer employed in the production of a cycloolefin polymer, which will be described later.

First, the cycloolefin polymer will be described.

(Cycloolefin Polymer)

The cycloolefin polymer includes one or two or more kinds of the structures represented by the general formula (1).

The following preferable conditions are given for each of the symbols in the general formula (1), and these conditions are used in combination, if necessary.

[1] The $R^1$ group contains at least one ring structure in the structure.

[2] The $R^3$ group is exemplified by the structures (a), (b), and (c) as examples of the structural unit including the $R^1$ group (in the case of n=0).

(a)

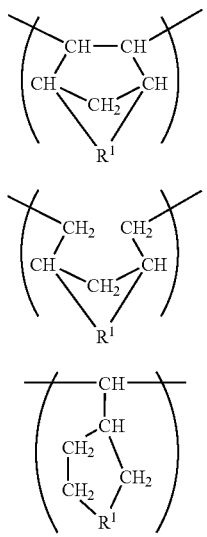

(b)

(c)

(wherein R¹ is a (2+n)-valent group selected from the group consisting of the hydrocarbon groups having 2 to 20 carbon atoms).

[3] n is 0.

[4] y/x is each a real number satisfying $20/80 \leqq y/x \leqq 65/35$, with x and y being presented on a molar basis,

[5] R² is a hydrogen atom or —$CH^3$, and a plurality of R²'s may be the same as or different from each other.

[6] Q is a —COOH or —$COOCH^3$ group.

The cycloolefin polymer preferably includes one or two or more kinds of the structures represented by the general formula (2), and the preferable conditions as described above are used in combination, if necessary.

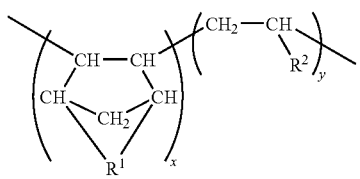

(2)

The following more preferable conditions are given for each of the symbols in the following general formula (2), and these conditions are used in combination, if necessary.

[1] The R¹ group is a di-valent group represented by the general formula (3):

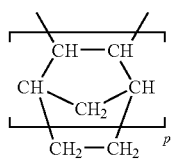

(3)

(wherein p is an integer of 0 to 2). More preferably, the R¹ group is the di-valent group represented by the general formula (3) wherein p is 1.

[2] R² is a hydrogen atom.

Among these, the cycloolefin polymer is most preferably a polymer obtained by the random addition polymerization of ethylene and tetracyclo[$4.4.0.1^{2,5}.1^{7,10}$]-3-dodecene (hereinafter abbreviated as TD) as a combined form thereof.

Types of Copolymerization

For the cycloolefin polymer, the types of copolymerization are not limited in the present invention, and various types of known copolymers such as a random copolymer, a block copolymer and an alternate copolymer can be employed. However, a random copolymer is preferred in the present invention.

Other Structures Useful in Part of Main Chain

The cycloolefin polymer used in the present invention may have a repeating structural unit derived from other copolymerizable monomers, within a scope of not causing deterioration of the preferred properties of the cycloolefin resin composition (C) of the present invention, if necessary. The copolymerization ratio is not limited, but it is preferably 20 mol % or less, more preferably 10 mol % or less. If the cycloolefin resin composition (C) of the present invention is used, for example, as an optical component, in the case where the copolymerization ratio is below the numeral value, a high-precision optical component can be obtained without deterioration of the optical property. In addition, the kinds of the copolymerization are not limited, but a random copolymer is preferred.

Molecular weight of Cycloolefin Polymer

The molecular weight of the cycloolefin polymer is not limited but in the case where an intrinsic viscosity [η] is used as an alternative index for the molecular weight, the intrinsic viscosity [η] measured in decalin at 135° C. is preferably in the range of 0.03 to 10 dl/g, more preferably 0.05 to 5 dl/g, most preferably 0.10 to 2 dl/g.

If the molecular weight is no more than the upper limit of the above the range, the moldability is not deteriorated, whereas if the molecular weight is no less than the lower limit of the range, the toughness of the molded product is not deteriorated, thus it being preferable.

Glass Transition Temperature of Cycloolefin Polymer

The glass transition temperature is not particularly limited, but it is preferably in a range of 50 to 240° C., more preferably in a range of 50° C. to 160° C., most preferably in the range of 100° C. to 150° C. If the glass transition temperature is no more than the upper limit of the range, it is possible to achieve good melt molding property. If the glass transition temperature is no less than the lower limit of the range, it is possible to guarantee an operation at a high temperature. Thus, if the glass transition temperature is within the above-described range, it is possible to obtain excellent balance among these physical properties.

For the method for measuring the glass transition temperature, a known method can be employed. The measuring devices are not limited, but the glass transition temperature can be measured, for example, by a differential scanning calorimeter (DSC), DSC-20 manufactured by Seiko Denshi Kogyo K.K at a temperature elevation rate of 10° C./min.

(Process for Producing Cycloolefin Polymer)

The cycloolefin polymer can be produced by the following process. If the cycloolefin polymer is an ethylene/cycloolefin random copolymer, it can be produced from ethylene and a cycloolefin represented by the following formula [I] or [II] by the production method as disclosed in Japanese Unexamined Patent Application Publication No. 7-145213. Preferably, this copolymerization is carried out in a hydrocarbon solvent with a catalyst formed from a vanadium compound and an organoaluminum compound soluble in the hydrocarbon solvent to produce an ethylene/cycloolefin random copolymer.

Further, in this copolymerization reaction, a solid Group-4 metallocene catalyst can be used. The solid Group-4 metallocene catalyst as used herein is a catalyst composed of a transition metal compound having a ligand having a cyclopentadienyl skeleton, an organoaluminumoxy compound, and an optionally added organoaluminum compound.

Examples of the Group-4 transition metal as used herein include zirconium, titanium, and hafnium. These transition metals have a ligand having at least one cyclopentadienyl skeleton. Examples of the ligand having a cyclopentadienyl skeleton as used herein include a cyclopentadienyl group, an indenyl, a tetrahydroindenyl group, and a fluorenyl group, each of which may have the alkyl group substituted. These groups may be bonded through another group such as an alkylene group. Examples of the ligand other than those containing a cyclopentadienyl skeleton include an alkyl group, a cycloalkyl group, an aryl group, and an aralkyl group.

Further, the organoaluminumoxy compound and the organoaluminum compound may be those which are conventionally used in the production of olefin resins. Such solid Group-4 metallocene catalysts are described, for example, in Japanese Unexamined Patent Application Publication Nos. 61-221206, 64-106, 2-173112, or the like.

If the cycloolefin polymer is a ring-opening polymer or copolymer, it can be produced, for example, by the polymerization or copolymerization of the cycloolefin monomers represented by the general Formula [I], as described below, in the presence of a ring-opening polymerization catalyst.

The ring-opening polymerization catalyst may be a catalyst composed of a halide, nitrate, or acetylacetonate of a metal such as ruthenium, rhodium, palladium, osmium, indium, and platinum, and a reducing agent; or a catalyst composed of a halide or acetylacetonate of a metal such as titanium, palladium, zirconium, and molybdenum, and an organoaluminum compound.

For the cycloolefin resin composition (A), the reaction solution after the production of the cycloolefin polymer as described above is preferably used. The cycloolefin resin composition (A) includes the cycloolefin polymer, the unsaturated hydrocarbon compound, and the solvent.

Hereinbelow, the cycloolefin monomer represented by the following formula [I] or [II] will be described.

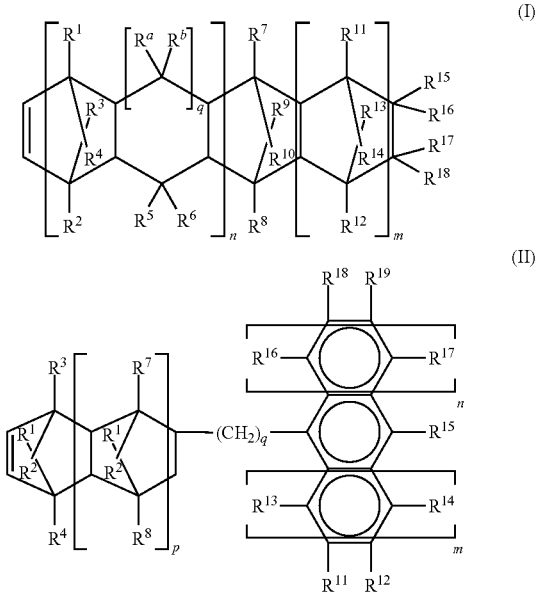

In the formula [I], n is 0 or 1, m is 0 or a positive integer, and q is 0 or 1. In the case where q is 1, $R^a$ and $R^b$ are each independently an atom as given below or a hydrocarbon group, and in the case where q is 0, they form a 5-membered ring by binding the chemical bonds with each other.

$R^1$ to $R^{18}$, and $R^a$ and $R^b$ each independently represent a hydrogen atom, a halogen atom or a hydrocarbon group. Here, the halogen atom as used herein is a fluorine atom, a chlorine atom, a bromine atom, or an iodine atom.

Examples of the hydrocarbon group each independently include an alkyl group having 1 to 20 carbon atoms, a cycloalkyl group having 3 to 15 carbon atoms or an aromatic hydrocarbon group. Specifically, examples of the alkyl group include a methyl group, an ethyl group, a propyl group, an isopropyl group, an amyl group, a hexyl group, an octyl group, a decyl group, a dodecyl group, and an octadecyl group. Examples of the cycloalkyl group include a cyclohexyl group, and examples of the aromatic hydrocarbon group include a phenyl group and a naphthyl group. These hydrocarbon groups may be substituted by a halogen atom.

In the formula [I], $R^{15}$ to $R^{18}$ may be bonded to each other (jointly) to form a mono- or polycyclic ring, wherein the mono- or polycyclic ring may have double bond(s). Specific examples of such mono- or polycyclic ring are as follows.

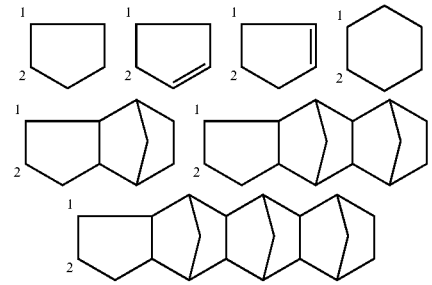

In the above exemplified formulae, the numerals 1 and 2 indicate respectively the carbon atoms where $R^{15}$ ($R^{16}$) or $R^{17}$ ($R^{18}$) are bonded. $R^{15}$ and $R^{16}$, or $R^{17}$ and $R^{18}$ may form an alkylidene group. The alkylidene group is usually an alkylidene group having 2 to 20 carbon atoms, and specific examples thereof include an ethylidene group, a propylidene group and an isopropylidene group.

In the formula [II], p and q each represent 0 or a positive integer, and m and n each represent 0, 1 or 2. $R^1$ to $R^{19}$ each represent a hydrogen atom, a halogen atom, a hydrocarbon group, or an alkoxy group.

The halogen atom has the same meaning as the halogen atom in the formula [I]. Examples of the hydrocarbon groups each independently include an alkyl group having 1 to 20 carbon atoms, a halogenated alkyl group having 1 to 20 carbon atoms, a cycloalkyl group having 3 to 15 carbon atoms, or an aromatic hydrocarbon group. Specifically, examples of the alkyl group as one of the hydrocarbon groups include a methyl group, an ethyl group, a propyl group, an isopropyl group, an amyl group, a hexyl group, an octyl group, a decyl group, a dodecyl group, and an octadecyl group. Examples of the cycloalkyl group include a cyclohexyl group, and examples of the aromatic hydrocarbon group include an aryl group and an aralkyl group, specifically, a phenyl group, a tolyl group, a naphthyl group, a benzyl group, and a phenylethyl group. The alkoxy group includes a methoxy group, an ethoxy group, and a propoxy group. The hydrocarbon group and the alkoxy group may be substituted by a fluorine atom, a chlorine atom, a bromine atom, or an iodine atom.

The carbon atom having $R^9$ and $R^{10}$ bonded thereto, and the carbon atom having $R^{13}$ bonded thereto or the carbon atom having $R^{11}$ bonded thereto may be linked together directly or indirectly through an alkylene group having 1 to 3 carbon atoms. In the case where the above two carbon atoms are linked through an alkylene group, the groups $R^9$ and $R^{13}$ or the groups $R^{10}$ and $R^{11}$ form together any one alkylene group selected from a methylene group (—$CH_2$—), an ethylene group (—$CH_2CH_2$—), or a propylene group (—$CH_2CH_2CH_2$—). With n=m=0, $R^{15}$ and $R^{12}$, or $R^{15}$ and $R^{19}$ may be bonded to each other to form a monocyclic or polycyclic aromatic ring. Examples of such the monocyclic or polycyclic aromatic ring include the following aromatic rings formed by $R^{15}$ and $R^{12}$ with n=m=0:

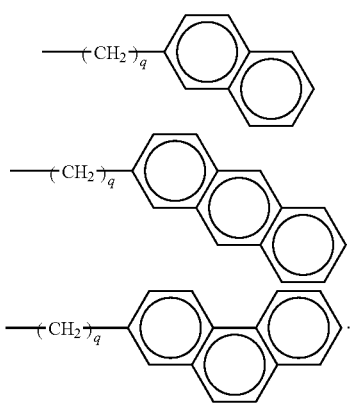

Here, q has the same meaning as q in the formula [II].

Specific examples of the cycloolefin monomers represented by the formula [I] or [III] are as follows.

As one example, bicyclo[2.2.1]-2-heptene (which may be referred to as norbornene) represented by the following formula, and a derivative thereof having a hydrocarbon substituent may be mentioned.

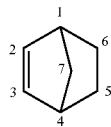

wherein the numerals 1 to 7 indicate carbon position numbers.

Examples of the hydrocarbon group include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenylyl), 5-(β-naphthyl), 5-(α-naphthyl), 5-(anthryl), and 5,6-diphenyl.

Examples of the other derivatives include bicyclo[2.2.1]-2-heptene derivatives such as a cyclopentadiene-acenaphthylene adduct, 1,4-methano-1,4,4a,9a-tetrahydrofluorene, and 1,4-methano-1,4,4a,5,10,10a-hexahydroanthracene.

Additional examples of the derivatives include tricyclo[4.3.0.1$^{2,5}$]-3-decene, and a derivative of tricyclo[4.3.0.1$^{2,5}$]-3-decene such as 2-methyltricyclo[4.3.0.1$^{2,5}$]-3-decene, and 5-methyltricyclo[4.3.0.1$^{2,5}$]-3-decene; tricyclo[4.4.0.1$^{2,5}$]-3-undecene, and a derivative of tricyclo[4.4.0.1$^{2,5}$]-3-undecene such as 10-methyltricyclo[4.4.0.1$^{2,5}$]-3-undecene; tetracyclo[4.4.0.1$^{2,5}$.1$^{7,10}$]-3-dodecene (which may also be referred to as tetracyclododecene) represented by the following chemical formula:

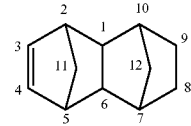

(wherein the numerals 1 to 12 indicate the carbon position numbers), and a derivative thereof having a hydrocarbon substituent.

Examples of the hydrocarbon group include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenylyl), 8-(β-naphthyl), 8-(α-naphthyl), 8-(anthryl), and 5,6-diphenyl.

Examples of the other derivatives include an acenaphthylene-cyclopentadiene adduct.

Additional examples of the derivatives include a pentacyclopetadecadiene compounds such as pentacyclo[6.5.1.1$^{3,6}$.0$^{2,7}$.0$^{9,13}$]-4-pentadecene, and a derivative thereof,
pentacyclo[7.4.0.1$^{2,5}$.1$^{9,12}$.0$^{8,13}$]-3-petadecene, and a derivative thereof, and
pentacyclo[6.5.1.1$^{3,6}$.0$^{2,7}$.0$^{9,13}$]-4,10-petadecadiene,
pentacyclo[8.4.0.1$^{2,5}$.1$^{9,12}$.0$^{8,13}$]-3-hexadecene, and a derivative thereof,
pentacyclo[6.6.1.1$^{3,6}$.0$^{2,7}$.0$^{9,14}$]-4-hexadecene, and a derivative thereof,
hexacyclo[6.6.1.1$^{3,6}$.1$^{10,13}$.0$^{2,7}$.0$^{9,14}$]-4-heptadecene, and a derivative thereof,
heptacyclo[8.7.0.1$^{2,9}$.1$^{4,7}$.1$^{1,17}$.0$^{3,8}$.0$^{12,16}$]-5-eicosene, and a derivative thereof,
heptacyclo[8.8.0.1$^{2,9}$.1$^{4,7}$.1$^{11,18}$.0$^{3,8}$.0$^{12,17}$]-5-heneicosene, and a derivative thereof,
octacyclo[8.8.0.1$^{2,9}$.1$^{4,7}$.1$^{11,18}$.1$^{13,16}$.0$^{3,8}$.0$^{2,7}$]-5-docosene, and a derivative thereof,
nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene, and a derivative thereof, and
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene, and a derivative thereof.

Specific examples of the cycloolefin monomers represented by the general formula [I] or [II] are shown above. More specific structures of these compounds are shown in Japanese Unexamined Patent Application Publication No. 7-145213, Paragraphs [0032] to [0054]. These cycloolefin resins used in the present invention may contain two or more kinds of units derived from the cycloolefin monomers.

The above cycloolefin monomers represented by the general formula [I] or [II] can be produced by a Diels-Alder reaction of a cyclopentadiene and an olefin having a corresponding structure. The higher purity of the cycloolefin monomers used in the polymerization is desirable, and the purity is usually 99% or more, preferably 99.6% or more, more preferably 99.9% or more.

<Process for Producing Cycloolefin Resin Composition (B)>

The process for producing a cycloolefin resin composition (B) of the present invention includes hydrogenating at least the unsaturated hydrocarbon compound in the cycloolefin resin composition (A).

In order to hydrogenate unsaturated hydrocarbon compounds such as cycloolefin monomers, it is preferable to pass the cycloolefin resin composition (A) through an absorber so as to remove by-products such as oxides, or the polymerization catalyst used in the production of a cycloolefin polymer, before the cycloolefin resin composition (A) is supplied into a reactor. The adsorber is charged with an adsorbent such as activated clay, activated carbon, diatomaceous earth, perlite, alumina, nickel, silica, and silica-alumina. Treatment with an adsorbent and filtration treatment can be used in combination. The conditions for treatment with an adsorbent, etc. will be described later.

The hydrogenation of the unsaturated hydrocarbon compound can be carried out by hydrogenating the unsaturated hydrocarbon compound in the cycloolefin resin composition (A) in the presence of a hydrogenation catalyst.

If the cycloolefin polymer is a ring-opening polymer or a ring-opening copolymer, it is general that the ring-opening polymer or the ring-opening copolymer is used after hydrogenation thereof. By hydrogenating the cycloolefin resin composition including the unsaturated hydrocarbon, the unsaturated hydrocarbon compounds such as the unreacted cycloolefin monomers and the ring-opening polymer or ring-opening copolymer can be hydrogenated at the same time, which is preferably allows a convenient reaction.

The method for hydrogenating the unsaturated hydrocarbon compound is not particularly limited, and a known method can be employed.

The hydrogenation reaction can be carried out by contacting the resin composition (A) in a solution state with hydrogen in the presence of a hydrogenation catalyst according to an ordinary method. As the hydrogenation catalyst, a homogeneous catalyst or a heterogeneous catalyst can be used. The heterogeneous catalyst can be highly activated at a high temperature and a high pressure, allowing hydrogenation in a short time, it is also easily removed, and it favorably provides a high yield.

Examples of the heterogeneous catalyst include a catalyst obtained by supporting a metal selected from the group consisting of nickel, ruthenium, rhenium, platinum, palladium, and rhodium on a carrier. The carrier is not particularly limited, and an adsorbent such as alumina and diatomaceous earth, which has been conventionally used for supporting a hydrogenation catalyst metal, can be used.

The amount of supported nickel is 20 to 80% by weight, preferably 30 to 60% by weight. The amounts of supported palladium and platinum are each 0.1 to 10% by weight, preferably 2 to 7% by weight. The shape is not particularly limited, including powders and solids, and is used as adapted for a device to be used.

In the present invention, any reaction vessel can be used for the hydrogenation reaction, but a fixed bed reactor is preferred due to its continuous running. Examples of the fixed bed reactor include (a) a packed column or plate column reactor, (b) a fixed catalyst reactor, and (c) a metal sieve or thin film catalyst reactor.

In the packed column or plate column reactor (a), the cycloolefin resin composition (A) in a solution state and hydrogen gas are contacted with each other in a cross-current contact, a counter-current contact, or a co-current contact in a column packed with catalyst particles.

The fixed catalyst reactor (b) is classified into an isothermal bed reactor, an adiabatic bed reactor, a multi-stage adiabatic bed reactor, a magnetic heat exchanging reactor, an external heat exchanging reactor, and the like, any of which can be used in the hydrogenation reaction of the present invention. Representative examples of the fixed catalyst reactor (b) include a reactor of the type as described in J. H. Gary and G. E. Handwerk: Petroleum Refining Technology and Economics (1975) p. 74, that is, a reactor configured so that ceramic balls are packed in the bottom, catalyst particles are packed in the center thereabove, and a mixture of the cycloolefin resin composition (A) in a solution state and gas is supplied from the top, and then a reaction product is discharged from the lower part.

The metal sieve or thin film catalyst reactor (c) is a reactor equipped with several sheets to several decades of sheets of a metal sieve, or a particulate catalyst in a thin film form, as a catalyst. The reactors are divided into two types according to the flow modes of the cycloolefin resin composition (A) in a solution state: a radial flow type and a parallel flow type, either of which may be used herein.

In the hydrogenation method according to the present invention, it is preferable that when the cycloolefin resin composition (A) in a solution state is passed through a fixed bed, the cycloolefin resin composition (A) is allowed to flow in a film shape on the surface of the catalyst particles. The cycloolefin resin composition (A) in a solution state and the hydrogen gas may flow in a co-current or counter-current flow mode, but a co-current mode is preferred, allowing easy modification of the operation conditions.

For the hydrogenation method according to the present invention, a reactor equipped with a fixed bed packed with a hydrogenation catalyst is used. This reactor is configured so that the cycloolefin resin composition (A) in a solution state is charged into the reactor, and hydrogen is flowed into the reactor in the state where a fixed bed packed with a catalyst is immersed in the resin composition (A). Typically, the reaction is carried out in a batch mode. Representative examples of the reactor include a reactor as described in Journal of Chemical Engineering of Japan, Vol. 27, No. 3 (1994) p. 310, that is, a reactor wherein a frame equipped in a rotating shaft is equipped with a cylindrical mesh basket made of stainless steel, packed with catalyst particles as a fixed bed, and also equipped with a stirrer. This reactor is charged with the cycloolefin resin composition (A) in a solution state, and a basket packed with a catalyst is rotated around the periphery of the rotating shaft in the state where the basket packed with a catalyst is immersed in the resin composition (A). Further, while stirring the resin composition (A), a hydrogen gas is compressed into the lower part of the reactor. Alternatively, a cage where the double cylinder of a double cylindrical mesh basket is packed with a catalyst is placed at a position spaced from the inner wall of the reactor, and also a rotating shaft in the center of the cylinder is equipped with a stirring blade may be used.

For the hydrogenation method according to the present invention, the cycloolefin resin composition (A) provided for the hydrogenation method is a solution having a cycloolefin polymer, an unsaturated hydrocarbon compound, and the like, dissolved in an organic solvent. This resin composition (A) is supplied into a reactor for hydrogenation in a solution state. The cycloolefin resin composition (A) is obtained as a reaction solution after the production of the cycloolefin polymer, and it is not particularly necessary to add an organic solvent, but the following organic solvent may be added. Such organic solvent is not particularly limited as long as it is inert to a catalyst. However, a hydrocarbon solvent, which provides good solubility of the resulting hydrogenation product, is usually used. Examples of the hydrocarbon solvent include an aromatic hydrocarbon such as benzene and toluene; an aliphatic hydrocarbon such as n-pentane and hexane; and an alicyclic hydrocarbon such as cyclohexane, methylcyclohexane, decalin, and non-cyclic nonane, among which a cyclic alicyclic hydrocarbon is preferred. These organic solvents can be used alone or in a combination of two or more kinds thereof. Typically, the organic solvent may be the same as a polymerization reaction solvent.

The hydrogenation reaction can be carried out according to an ordinary process, but a hydrogenation rate or an aromatic ring residual rate may vary depending on the kind of a hydrogenation catalyst or the reaction temperature. Thus, if the above-described hydrogenation catalyst is used, regulations such as lowering the reaction temperature or the hydrogen pressure, and shortening the reaction time are conducted so as to maintain the residual rate of the unsaturated bonds of the aromatic ring over a predetermined level.

In order to hydrogenate the unsaturated hydrocarbon compound in the cycloolefin resin composition (A), the temperature is preferably no higher than the decomposition temperature of the monomer, and the operating temperature for hydrogenation is 0 to 150° C., preferably 60 to 130° C., more preferably 80 to 120° C.

Further, the pressure is 1 to 50 kg/cm$^2$, preferably 1 to 30 kg/cm$^2$, more preferably 1 to 20 kg/cm$^2$. Further, the reaction time varies depending on the hydrogenation catalyst used, but it is 1 hour or less, preferably 30 minutes or less.

The LHSV for the hydrogenation reaction is usually 1 to 10, preferably 3 to 5. As used herein, LHSV refers to reciprocal of a residence time, and is determined by dividing a feeding flow rate of the cycloolefin resin composition (A) including the unreacted cycloolefin monomers obtained by the polymerization of cycloolefin monomers in a hydrocarbon solvent by a catalyst-packed volume.

The cycloolefin resin composition in a solution state discharged from the fixed bed reactor is introduced into a separator such as a flash separator, and then the cycloolefin resin composition (B) having a saturated hydrocarbon compound hydrogenated and the unreacted hydrogen are separated. The separated hydrogen can be recycled into a hydrogenation reactor.

<Cycloolefin Resin Composition (B)>

The cycloolefin resin composition (B) contains a saturated hydrocarbon compound having a boiling point of 50° C. or higher, obtained by the hydrogenation of the above-described unsaturated hydrocarbon compound. The saturated hydrocarbon compound is obtained by the hydrogenation of 80% by weight or more, preferably 90% by weight or more, more preferably 98% by weight or more, particularly preferably 98 to 100% by weight of the unsaturated hydrocarbon compound in an amount of 0.01 to 20 parts by weight, per 100 parts by weight of the cycloolefin resin composition (A). Further, the cycloolefin resin contained in the cycloolefin resin composition (A) is suitably hydrogenated.

The cycloolefin resin composition (B) includes a cycloolefin resin having one or two or more kinds of the structures represented by the following general formula (4).

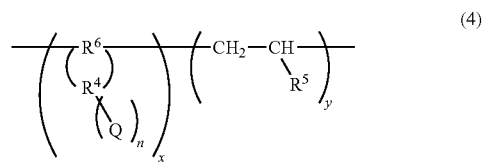

(wherein x and y each represent a copolymerization ratio, and are each a real number satisfying $0/100 \leq y/x \leq 95/5$, with x and y being presented on a molar basis, n represents the number of a substituent Q, and is an integer satisfying $0 \leq n \leq 2$, $R^4$ is a (2+n)-valent group selected from the group consisting of hydrocarbon groups having 2 to 20 carbon atoms, and a plurality of $R^4$'s, if any, may be the same as or different from each other, $R^5$ is a hydrogen atom or a mono-valent group selected from the group consisting of a hydrocarbon group having 1 to 10 carbon atoms composed of carbon and hydrogen, and a plurality of $R^5$'s, if any, may be the same as or different from each other, $R^6$ is a tetra-valent group selected from the group consisting of hydrocarbon groups having 2 to 10 carbon atoms, and a plurality of $R^6$'s, if any, may be the same as or different from each other, and Q is represented by COOR$^7$ (in which $R^7$ is a hydrogen atom or a mono-valent group selected from the group consisting of a hydrocarbon group having 1 to 10 carbon atoms composed of carbon and hydrogen), and a plurality of Q's, if any, may be the same as or different from each other).

The following preferable conditions are given for each of the symbols in the general formula (1), and these conditions are used in combination, if necessary.

[1] The $R^4$ group is a group containing at least one ring structure in the structure.

[2] The $R^6$ group is exemplified by the structures (a), (b), and (c) as examples of the structural unit including the $R^4$ group (in the case of n=0).

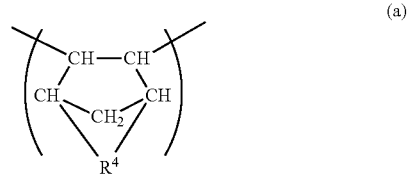

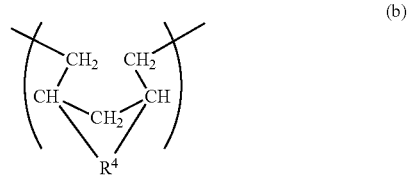

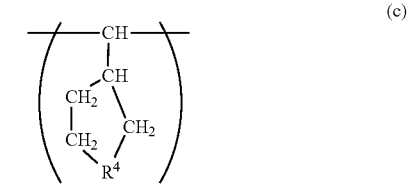

(wherein $R^4$ is a (2+n)-valent group selected from the group consisting of the hydrocarbon groups having 2 to 20 carbon atoms).

[3] n is 0.

[4] y/x is each a real number satisfying $20/80 \leq y/x \leq 65/35$, with x and y being presented on a molar basis,

[5] $R^5$ is a hydrogen atom and/or —$CH^3$, and a plurality of $R^5$'s may be the same as or different from each other

[6] Q is a —COOH or —$COOCH^3$ group.

The cycloolefin polymer preferably includes one or two or more kinds of the structures represented by the general formula (5), and the preferable conditions as described above are used in combination, if necessary.

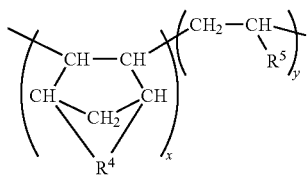

(5)

The following preferable conditions are given for each of the symbols in the general formula (5), and these conditions are used in combination, if necessary.

[1] The $R^4$ group is a di-valent group represented by a general formula (6):

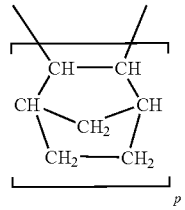

(6)

(wherein p is an integer of 0 to 2). More preferably, the $R^4$ group is the di-valent group represented by the general formula (6) wherein p is 1.

[2] $R^5$ is a hydrogen atom.

Among these, the cycloolefin polymer is most preferably a polymer obtained by the random addition polymerization of ethylene and tetracyclo[$4.4.0.1^{2,5}.1^{7,10}$]-3-dodecene (hereinafter abbreviated as TD) as a combined form thereof.

Types of Copolymerization

For the cycloolefin polymer, the types of copolymerization are not limited in the present invention, and various types of known copolymers such as a random copolymer, a block copolymer and an alternate copolymer can be employed. However, a random copolymer is preferred in the present invention.

Other Structures Useful in Part of Main Chain

The cycloolefin polymer used in the present invention may have a repeating structural unit derived from other copolymerizable monomers within a scope of not causing deterioration of properties of the cycloolefin resin composition (C) of the present invention, if necessary. The copolymerization ratio is not limited, but it is preferably 20 mol % or less, more preferably 10 mol % or less. If the cycloolefin resin composition (C) of the present invention is used, for example, as an optical component, in the case where the copolymerization ratio is below the value range, a high-precision optical component can be obtained without deterioration of the optical property. In addition, the kinds of the copolymerization are not limited, but a random copolymer is preferred.

Molecular Weight of Cycloolefin Polymer

The molecular weight of the cycloolefin polymer is not limited but in the case where an intrinsic viscosity [0] is used as an alternative index for the molecular weight, the intrinsic viscosity [α] measured in decalin at 135° C. is preferably in the range of 0.03 to 10 dl/g, more preferably 0.05 to 5 dl/g, most preferably 0.10 to 2 dl/g.

If the molecular weight is no more than the upper limit of the above the range, the moldability is not deteriorated, whereas if the molecular weight is no less than the lower limit of the range, the toughness of the molded product is not deteriorated, thus it being preferable.

Glass Transition Temperature of Cycloolefin Polymer

The glass transition temperature is not particularly limited, but it is preferably in a range of 50 to 240° C., more preferably in a range of 50° C. to 160° C. Among them, it is most preferably in the range of 100° C. to 150° C. If the glass transition temperature is no more than the upper limit of the range, it is possible to achieve good melt molding property. If the glass transition temperature is no less than the lower limit of the range, it is possible to guarantee an operation at a high temperature. Thus, if the glass transition temperature is within the above-described range, it is possible to obtain excellent balance among these physical properties.

For the measuring method of the glass transition temperature, a known method can be employed. The measuring devices are not limited, but the glass transition temperature can be measured, for example, by a differential scanning calorimeter (DSC), DSC-20 manufactured by Seiko Denshi Kogyo K.K at a temperature elevation rate of 10° C./min.

In the present invention, it is not necessary to remove the catalyst from the cycloolefin resin composition (B), but in the applications such as medical materials, in which elution of a remaining transition metal is likely to be harmful, it is preferable that the transition metal do not substantially remained. For this reason, after hydrogenation, centrifugation, filtration, or the like is preferably carried out. Further, a catalyst deactivator such as water and alcohol may be used, if necessary, and an adsorbent such as activated clay and alumina may be added. Further, in order to obtain such a polymer hydrogenation product, it is preferable to use an adsorbent such as alumina having a specific pore volume and a specific surface area, as described, for example, in Japanese Unexamined Patent Application Publication No. 5-317411, or to wash the cycloolefin resin composition (B) with acidic water and pure water.

The centrifugation or filtration method is not particularly limited, as long as it is carried out under such the condition that the catalyst used can be removed. Removal by filtration is convenient and efficient, thus it being preferable. Pressure filtration or suction filtration may be carried out, and it is preferable that a filtration adjuvant such as diatomaceous earth and perlite be used from a viewpoint of efficiency.

(Method for Treating Cycloolefin Resin Composition (B) with Adsorbent)

The cycloolefin resin composition (B) is preferably passed through an absorber so as to remove by-products such as oxides, or the polymerization catalyst used in the production of a cycloolefin polymer. The adsorber is charged with an adsorbent such as activated clay, activated carbon, diatomaceous earth, perlite, alumina, nickel, silica, silica-alumina, and molecular sieve. Treatment with an adsorbent and filtration treatment can be used in combination. Such the treatment with an adsorbent may be carried out for the cycloolefin resin composition (A) before hydrogenation, or for the cycloolefin resin composition (B) after hydrogenation. Also, such the treatment can be carried out in the coexistence of a hydrogenation catalyst and an adsorbent in a hydrogenation reactor.

The optimal conditions for adsorption treatment are as follows.

In the adsorption treatment, the temperature of the cycloolefin resin composition (B) is 0 to 200° C., preferably 20 to 150° C. If the temperature is higher than 200° C., the cycloolefin polymer begins to be deteriorated, thus it being not preferable. Further, the retention time is preferably 10 to 60 min, more preferably 20 to 40 min.

<Process for Producing Cycloolefin Resin Composition (C)>

The cycloolefin resin composition (C) is obtained by removing the solvent and a part of the saturated hydrocarbon compound, which are contained in the cycloolefin resin composition (B). Further, if a part of the unsaturated hydrocarbon compound contained in the cycloolefin resin composition (A) is removed so as to recycle the unreacted monomers into a polymerization reaction, etc., and the content of the saturated hydrocarbon compound contained in the cycloolefin resin composition (B) is reduced, mainly the solvent is removed from the cycloolefin resin composition (B).

Specifically, by recovering the polymers from the cycloolefin resin composition (B) by precipitation, the cycloolefin resin composition (C) can be obtained. As the precipitation method, any one selected from a method using a thin film evaporator, a method in a double pipe flash method, and the like can be used, and a plurality of precipitation methods may be used in a combination. In particular, in the case of a cycloolefin polymer in which the molecular chain may be cleaved from the molecular structure by shear stress, it is suitable to use at least the method in a double pipe flash method, on which a torque load has little effect.

For the method in the double pipe flash method, typically the cycloolefin resin composition (B) in a solution state is first heated by using a double pipe heater. The cycloolefin resin composition (B) is heated by using this heater, and at a time of heating, the concentration of the cycloolefin polymer is preferably adjusted usually to from 1 to 30% by weight.

The heating temperature should be a temperature which is sufficient to thoroughly volatilize the solvent in the cycloolefin resin composition (B) in the subsequent flash drying step, and is usually from 40 to 400° C. preferably 100 to 300° C. In the present invention, in the step for flash drying the cycloolefin resin composition (B) after completion of the above-mentioned heating step, the hydrogenated saturated hydrocarbon compound and the unhydrogenated, unsaturated hydrocarbon compound, or the like, as well as the polymerization solvent are removed therefrom. In this removal step, the saturated hydrocarbon compound is not completely removed from the resin composition (B) after the hydrogenation of the unsaturated hydrocarbon, and thus a part of the saturated hydrocarbon compound remains. Specifically, the saturated hydrocarbon compound is contained in an amount of 0.01 to 10 parts by weight, per 100 parts by weight of the cycloolefin polymer.

Conventionally, in order to improve the stability or physical properties of the cycloolefin polymer, the cycloolefin resin composition including the unsaturated hydrocarbon compounds such as monomers has been subject to drying, or other treatments, thereby accomplishing substantial removal of the unsaturated hydrocarbon compound.

Under these circumstances, the present inventors have made extensive studies thereon, and as a result, they have found that by incorporating a saturated hydrocarbon compound obtained by the hydrogenation of an unsaturated hydrocarbon compound in a cycloolefin resin composition including the unsaturated hydrocarbon compound, in a predetermined amount per the amount of the cycloolefin polymer, a cycloolefin resin composition having excellent moldability is obtained, and the deterioration of a resin derived from shear occurring between the resin and a mold during molding is suppressed, due to its excellent flowability, thereby obtaining a molded product having excellent optical characteristics such as light transmittance. Based on this finding, the present invention has been completed. As such, in the production process of the present invention, it is important that the saturated hydrocarbon compound is contained in a predetermined amount per the amount of the cycloolefin polymer.

The cycloolefin resin composition (B) in a solution state after completion of the heating step under the above-mentioned condition is flash dried in the double pipe flash drying method to produce a cycloolefin polymer (C) including 0.01 to 10 parts by weight of the saturated hydrocarbon compound per 100 parts by weight of the cycloolefin polymer. For this, it is preferable to give the resin composition (B) such a pressure and a quantity of heat that the temperature as preset in the double pipe heater and the flash drier becomes a temperature at which no solidification of the cycloolefin polymer in the cycloolefin resin composition (B) will take place, specifically 120 to 300° C., preferably 130 to 240° C. Further, in the flash drying step for the cycloolefin resin composition (B) in such manner, it is preferable to feed the cycloolefin resin composition (B) in a solution state to the double pipe heater at a rate of at least 0.3 m/sec or so in order to inhibit staining of a heat transfer surface of the double pipe heater.

The cycloolefin resin composition (C) including a specific amount of a specific unsaturated hydrocarbon compound having a boiling point of 50° C. or higher according to the present invention can be efficiently obtained by this production process, for example, in the double pipe flash drying method, under the above-described production conditions.

<Cycloolefin Resin Composition (C)>

The cycloolefin resin composition (C) of the present invention can be obtained by the above-described production process of the present invention, and includes 0.01 to 10 parts by weight of the saturated hydrocarbon compound having a boiling point of 50° C. or higher, per 100 parts by weight of the cycloolefin polymer. Further, in the present invention, it is not excluded that the cycloolefin resin composition (C) further includes a small amount of a solvent and an unsaturated hydrocarbon compound, within a scope of not adversely affecting the effect of the present invention.

If the saturated hydrocarbon compound is contained within the above-described range, a cycloolefin resin composition which is improved the poor appearance derived from insufficient transferability during molding (so-called flowability at a molding), which exhibits inhibited coloring derived from thermal history caused by retention at a high temperature or the like, and which can be easily molded, can be obtained.

The cycloolefin resin composition (C) includes a cycloolefin resin having one or two or more kinds of the structures represented by the general formula (4):

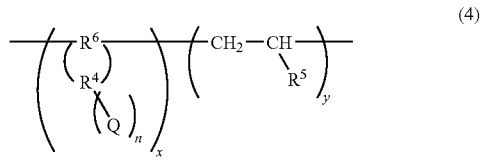

(4)

(wherein x and y each represent a copolymerization ratio, and are each a real number satisfying $0/100 \leq y/x \leq 95/5$, with x and y being presented on a molar basis, n represents the number of a substituent Q, and is an integer satisfying $0 \leq n \leq 2$, $R^4$ is a (2+n)-valent group selected from the group consisting of hydrocarbon groups having 2 to 20 carbon atoms, and a plurality of $R^4$'s, if any, may be the same as or different from each other, $R^5$ is a hydrogen atom or a mono-valent group selected from the group consisting of a hydrocarbon group having 1 to 10 carbon atoms composed of carbon and hydrogen, and a plurality of $R^5$'s, if any, may be the same as or different from each other, $R^6$ is a tetra-valent group selected from the group consisting of hydrocarbon groups having 2 to 10 carbon atoms, and a plurality of $R^6$'s, if any, may be the same as or different from each other, and Q is represented by $COOR^7$ (in which $R^7$ is a hydrogen atom or a mono-valent group selected from the group consisting of a hydrocarbon group having 1 to 10 carbon atoms composed of carbon and hydrogen), and a plurality of Q's, if any, may be the same as or different from each other).

The following preferable conditions are given for each of the symbols in the general formula (4), and these conditions are used in combination, if necessary.

[1] The $R^4$ group is a group containing at least one ring structure in the structure.

[2] The $R^6$ group is exemplified by the structures (a), (b), and (c) as examples of the structural unit including the $R^4$ group (in the case of n=0).

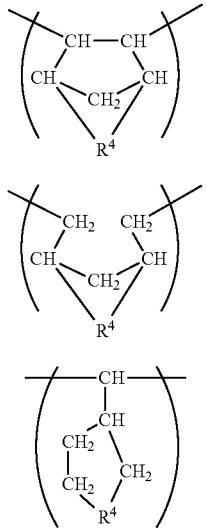

(wherein $R^4$ is a (2+n)-valent group selected from the group consisting of the hydrocarbon groups having 2 to 20 carbon atoms).

[3] n is 0.

[4] y/x is each a real number satisfying $20/80 \leq y/x \leq 65/35$, with x and y being presented on a molar basis,

[5] $R^5$ is a hydrogen atom and/or —$CH^3$, and a plurality of $R^5$'s may be the same as or different from each other

[6] Q is a —COOH or —$COOCH^3$ group, wherein the cycloolefinic resin composition (C) includes 0.01 to 10 parts by weight of a saturated hydrocarbon compound having a boiling point of 50° C. or higher, per 100 parts by weight of the cycloolefinic polymer having one or two or more kinds of the structures represented by the general formula (4).

The cycloolefin polymer preferably includes one or two or more kinds of the structures represented by the general formula (5), and the preferable conditions as described above are used in combination, if necessary.

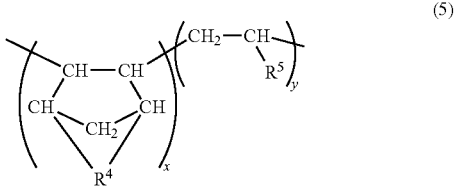

The following preferable conditions are given for each of the symbols in the general formula (5), and these conditions are used in combination, if necessary.

[1] The $R^4$ group is a di-valent group represented by a general formula (6):

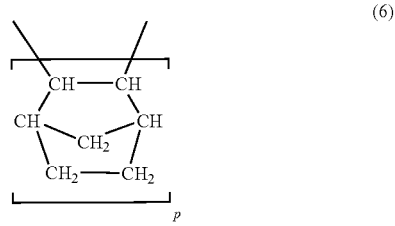

(wherein p is an integer of 0 to 2). More preferably, the $R^4$ group is the di-valent group represented by the general formula (6) wherein p is 1.

[2] $R^5$ is a hydrogen atom.

Among these, the cycloolefin polymer is most preferably a polymer obtained by the random addition polymerization of ethylene and tetracyclo[$4.4.0.1^{2,5}.1^{7,10}$]-3-dodecene (hereinafter abbreviated as TD) as a combined form thereof.

Types of Copolymerization

For the cycloolefin polymer, the types of copolymerization are not limited in the present invention, and various types of known copolymers such as a random copolymer, a block copolymer and an alternate copolymer can be employed. However, a random copolymer is preferred in the present invention.

Other Structures Useful in Part of Main Chain

The cycloolefin polymer used in the present invention may have a repeating structural unit derived from other copolymerizable monomers, within a scope of not causing deterioration of the preferred properties of the cycloolefin resin composition (C) of the present invention, if necessary. The copolymerization ratio is not limited, but it is preferably 20 mol % or less, more preferably 10 mol % or less. If the cycloolefin resin composition (C) of the present invention is used, for example, as an optical component, in the case where the copolymerization ratio is below the numeral value, a high-precision optical component can be obtained without deterioration of the optical property. In addition, the kinds of the copolymerization are not limited, but a random copolymer is preferred.

Molecular Weight of Cycloolefin Polymer

The molecular weight of the cycloolefin polymer is not limited but in the case where an intrinsic viscosity [α] is used as an alternative index for the molecular weight, the intrinsic viscosity [α] measured in decalin at 135° C. is preferably in the range of 0.03 to 10 dl/g, more preferably 0.05 to 5 dl/g, most preferably 0.10 to 2 dl/g.

If the molecular weight is no more than the upper limit of the above the range, the moldability is not deteriorated, whereas if the molecular weight is no less than the lower limit of the range, the toughness of the molded product is not deteriorated, thus it being preferable.

Glass Transition Temperature of Cycloolefin Polymer

The glass transition temperature is not particularly limited, but it is preferably in a range of 50 to 240° C., more preferably in a range of 50° C. to 160° C. Among them, it is most preferably in the range of 100° C. to 150° C. If the glass transition temperature is no more than the upper limit of the range, it is possible to achieve good melt molding property. If the glass transition temperature is no less than the lower limit of the range, it is possible to guarantee an operation at a high temperature. Thus, if the glass transition temperature is within the above-described range, it is possible to obtain excellent balance among these physical properties.

For the measuring method of the glass transition temperature, a known method can be employed. The measuring devices are not limited, but the glass transition temperature can be measured, for example, by a differential scanning calorimeter (DSC), DSC-20 manufactured by Seiko Denshi Kogyo K.K at a temperature elevation rate of 10° C./min.

Further, the cycloolefin polymer contained in the cycloolefin resin composition (C) is obtained by suitably hydrogenating the cycloolefin polymer in the above-described hydrogenation step.

The saturated hydrocarbon compound is obtained, for example, by the hydrogenation of the unsaturated hydrocarbon compound in the above-described hydrogenation step. It has a boiling point of 50° C. or higher, preferably a boiling point of 100° C. or higher, more preferably a boiling point of 200° C. or higher, most preferably a boiling point of 210° C. or higher. If the saturated hydrocarbon compound has a boiling point within the above-described range, it does not volatilize during molding, and as a result, it does not deteriorate the appearance of a molded product, thus it being preferable. Further, the boiling point can be measured by a known method.

In the cycloolefin resin composition (C) of the present invention, in addition to the constituents mentioned above, a known weathering agent, a heat-resistant stabilizer, an antistatic agent, a fire retardant, a slip agent, an antiblocking agent, an antifogging agent, a lubricant, a natural oil, a synthetic oil, a wax, an organic or inorganic filler, or the like may be blended within the scope of not adversely affecting the preferred properties of the optical components of the present invention.

For example, as for the weathering agent blended as an arbitrary component, ultraviolet absorbers such as a benzophenone-based compound, a benzotriazole-based compound, a nickel-based compound, and a hindered amine-based compound are given as a light-resistant stabilizer other than a known hindered amine-based additive.

The hindered amine-based light-resistant stabilizer is a compound which typically has a 3,5-di-t-butyl-4-hydroxyphenyl group, and a 2,2,6,6-tetramethylpiperidyl group or a 1,2,2,6,6-pentamethyl-4-piperidyl group in its structure, and the specific examples thereof include 1-[2-[3-(3,5-di-t-butyl-4-hydroxyphenyl)propionyloxy]ethyl]-4-(3,3,5-di-t-butyl-4-hydroxyphenyl)propionyloxy]-2,2,6,6-tetramethylpiperidine (for example, Sanol LS-2626 manufactured by Sankyo Co., Ltd.), and 2-(3,5-di-t-butyl-4-hydroxybenzyl)-2-n-butylmalonate-bis-(1,2,2,6,6-pentamethyl-4-piperidyl)(for example, Tinuvin 144 manufactured by Nippon Chiba-Geigy Co., Ltd.).

Specific examples of the benzotriazole-based ultraviolet absorbers include 2-(5-methyl-2-hydroxyphenyl)benzotriazole, 2,2-hydroxy-3,5-bis(α,α-dimethylbenzyl)phenyl, 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-4'-n-octoxyphenyl)benzotriazole, Tinuvin 328 and Tinuvin PS, which are both manufactured by Nippon Chiba-Geigy Co., Ltd., or benzotriazole derivatives such as SEESORB709 (2-(2'-hydroxy-5'-t-octylphenyl)benzotriazole, manufactured by Shiraishi Calcium Kaisha, Ltd.).

Specific examples of the benzophenone-based ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-5-sulfobenzophenone trihydrate, 2-hydroxy-4-n-octoxy benzophenone, 2-hydroxy-4-octadecyloxy benzophenone, 2-hydroxy-4-n-dodecyloxy benzophenone, 2-hydroxy-4-benzyloxybenzophenone, 2,2',4,4'-tetrahydroxy benzophenone, 2-hydroxy-4-dodecyloxy benzophenone, 2-hydroxy-4-(2-hydroxy-3-methacryloxy)propoxybenzophenone, or Uvinul 490 (a mixture of 2,2'-dihydroxy-4,4'-dimethoxy/benzophenone and other tetrasubstituted benzophenone, manufactured by GAF), PermylB-100 (benzophenone compound, manufactured by Ferro company).

Examples of the heat-resistant stabilizer blended as an arbitrary component include a phenolic antioxidant such as tetrakis[methylene3-(3,5-d-t-butyl-4-hydroxyphenyl)propionate]methane, β-(3,5-di-t-butyl-4-hydroxyphenyl)alkyl propionate ester, and 2,2'-oxamidebis[ethyl-3-(3,5-di-t-butyl-4-hydroxyphenyl)propionate];

a fatty acid metal salt such as zinc stearate, calcium stearate, and calcium 1,2-hydroxystearate; and a polyalcohol fatty acid ester such as glycerin monostearate, glycerin distearate, pentaerythritol monostearate, pentaerythritol distearate, and pentaerythritol tristearate.

Further, phosphorous stabilizers such as distearyl pentaerythritol diphosphate, phenyl-4,4'-isopropylidene diphenyl pentaerythritol diphosphate, bis(2,6-di-t-butyl-4-methylphenyl)pentaerythritol diphosphate, and tris(2,4-di-t-butylphenyl)phosphate may be used. These stabilizers may be used in single or in combination with each other. For example, combinations of tetrakis[methylene-3-(3,5-di-t-butyl-4-hydroxyphenyl)propionate]methane, zinc stearate, and glycerin monostearate may be exemplified. Theses stabilizers may be used alone or in a combination of two or more kinds thereof.

The method for blending the cycloolefin resin composition (C) of the present invention and the additives is not limited, and a known method can be used. For example, the method includes simultaneously blending each component.

<Molded Product>

The cycloolefin resin composition (C) of the present invention can be used to produce a molded product by pelletizing it in an ordinary method by means of an extruder, and then subjecting the pellet to injection molding. Particularly, the molded product can be employed for optical lenses such as pickup-lenses for an optical disc optical system, collimator lenses, or various lenses for capturing small image.

In the case of using the molded product for optical applications such as optical lenses, it is necessary to transmit light. Therefore, it is favorable to have a light transmittance in a preferred range. The light transmittance is defined by a spectral light transmittance or a total light transmittance according to the applications.

In the case of using the molded product in total light or a plurality of wavelength region, it is necessary to have good total light transmittance. The total light transmittance is preferably 85% or more and more preferably 88% or more. When the light transmittance is within the above-described range, a required amount of light can be obtained in total light or a plurality of wavelength region.

As a measuring method therefor, a known method can be used. The measuring devices are not limited, but a total light transmittance can be measured using a sheet having a thickness of 3 mm with a haze meter in accordance with ASTM D1003.

Further, in the case of an optical system (for example, a laser optical system) using only a specific wavelength region, even when the total light transmittance is not relatively high, it can be still used as long as the spectral light transmittance in the specific wavelength region is in a preferred range. In this case, the spectral light transmittance in the used wavelength is preferably 85% or more, more preferably 88% or more. When the spectral light transmittance is within the above-described range, a required amount of light can be obtained.

As a measuring method therefor, a known method can be used. The measuring devices are not limited. The spectral light transmittance in a specific wavelength region can be measured, for example, by using an ultraviolet-visible spectrophotometer.

EXAMPLES

Next, the present invention is further described with reference to the following Examples, but it should be construed that the invention is not limited to those Examples.

A measuring method of the physical property as used herein is performed by following methods.

(1) Glass Transition Temperature (Tg)

A glass transition temperature was measured by heating a sample under the condition of temperature elevation up to 250° C. at a rate of 10° C./min in nitrogen and then cooling quickly to measure the sample at the rate of 10° C./min by using DSC-20 manufactured by Seiko Denshi Kogyo K.K.

(2) Number Average Molecular Weight (Mn)

The number average molecular weight was analyzed by using GPC Alliance 2000 (Waters Corp.) under the following conditions.

Column: TSKgel GMH6-HTx2+TSKgel GMH6-HTLX2 (total: 30 cm×4, Tosoh Corp.)
Detector: Differential refractometer
Solvent: o-Dichlorobenzene
Flow rate: 1 mL/min
Temperature: 140° C.
Amount of Injected Sample: 500 μL
Standard Sample: Monodisperse Polystyrene×16 (Tosoh Corp.)

Example A

Synthesis Example a-1

An addition copolymer (cycloolefin polymer) of ethylene and tetracyclo[4.4.0.1$^{2,5}$.1$^{7,10}$]-3-dodecene (hereinafter abbreviated as TD) was produced in a cyclohexane solvent with a vanadium catalyst (VOCl$_3$) by a known method, to obtain a cycloolefin resin composition (A). The copolymerization ratio y/x, represented as ethylene/TD, was 64/36 on a molar basis.

After completion of polymerization, the remaining catalyst was removed from the cycloolefin resin composition (A). As a result, 86.3 parts by weight of cyclohexane, 7.7 parts by weight of a cycloolefin polymer, and 6 parts by weight of a monomer composition were contained in the cycloolefin resin composition (A).

Example a-1

The cycloolefin resin composition (A) obtained in Synthesis Example a-1 was continuously hydrogenated with a Ni/diatomaceous earth catalyst (N112 manufactured by Nikki Chemical Co., Ltd.) under the condition of a reaction temperature of 100° C., a reaction pressure of 1 MPa, and a LHSV=5/hr, to obtain a cycloolefin resin composition (B). The hydrogenation rate of the unsaturated hydrocarbon compound was 99%, as quantitated by gas chromatography.

Then, the resulting hydrogenated cycloolefin resin composition (B) was subject to adsorption treatment with activated alumina (FD-24 manufactured by Sumitomo Chemical Co., Ltd.). Further, it was subject to pressure filtration by using a commercially available filter, heated, and dried to remove the solvent and a part of a hydrogenation product of the monomers, thereby obtaining a cycloolefin resin composition (C). The amount of TD in the cycloolefin resin composition (C) was 4800 ppm, that is, the saturated hydrocarbon compound was contained in the cycloolefin resin composition (C), in an amount of 0.5 part by weight per 100 parts by weight of the cycloolefin polymer.

The resulting composition was pelletized by passing it through an extruder, and the pellet was injection molded to produce a rectangular test piece having a thickness of 3 mm. The spectral light transmittance at 405 nm was 89.2%, as measured using this rectangular test piece having a thickness of 3 mm.

Comparative Example a-1

The cycloolefin resin composition (A) obtained in Synthesis Example 1 was heated and dried to remove the solvent and the monomers from the cycloolefin resin composition (A) without hydrogenation. Then, the resulting composition was pelletized by passing it through an extruder, and the pellet was injection molded to produce a rectangular test piece having a thickness of 3 mm. The spectral light transmittance at 405 nm was 87.1%, as measured using the rectangular test piece having a thickness of 3 mm.

Example B

Synthesis Example b-1

An addition copolymer (cycloolefin polymer) of ethylene and tetracyclo[4.4.0.1$^{2,5}$.1$^{7,10}$]-3-dodecene (hereinafter abbreviated as TD) was produced in a cyclohexane solvent with a vanadium catalyst (VOCl$_3$) by a known method, to obtain a cycloolefin resin composition (A). The copolymerization ratio (y/x), represented as ethylene/TD, was 64/36 on a molar basis. 86.3 parts by weight of cyclohexane, 7.7 parts by weight of a cycloolefin polymer, and 6 parts by weight of a monomer composition were contained in the cycloolefin resin composition (A).

After completion of polymerization, the cycloolefin resin composition (A) was put into a mixed solvent of acetone/methanol (volume ratio 1/1) added with concentrated hydrochloric acid (50 ml/L) to precipitate the total amount of the polymers. After stirring, the polymers were filtered by means of a glass filter, and dried under reduced pressure to obtain a cycloolefin resin composition.

Synthesis Example b-2

In the similar manner as described in Synthesis Example b-1, polymerization, precipitation, and filtration were carried out, and then the resultant was dissolved in cyclohexane to a concentration about 3% (% by weight). Further, it was put into a mixed solvent of acetone/methanol (volume ratio 1/1) to precipitate a total amount of the polymers. Thereafter, the polymers were filtered by means of a glass filter, and dried under reduced pressure to obtain a cycloolefin resin composition.

Synthesis Example b-3

In the similar manner as described in Synthesis Example b-1, the solvent and a part of the monomers were distilled off by means of a rotary evaporator to obtain a cycloolefin resin composition.

Synthesis Examples b-4 to b-6

After completion of polymerization, the same procedures as described in Synthesis Examples b-1 to b-3 except that cycloolefin resin composition (A) was hydrogenated by using a palladium/alumina catalyst were carried out to obtain a cycloolefin resin composition (C) of Synthesis Examples b-4 to b-6.

The results of the glass transition temperature (Tg), the number average molecular weight (Mn), and the contents of TD and the TD hydrogenation product, as measured by gas chromatography, of the resin composition obtained in each of Synthesis Examples are shown in the following Table.

TABLE 1

| Synthesis Example | Tg | Mn (×10$^4$) | TD (ppm) | TD hydrogenation product (ppm) |
|---|---|---|---|---|
| b-1 | 135 | 10.4 | 4300 | 0 |
| b-2 | 134 | 10.8 | 390 | 0 |
| b-3 | 131 | 10.3 | 24000 | 0 |
| b-4 | 134 | 10.6 | ≦10 | 6500 |
| b-5 | 136 | 10.5 | ≦10 | 550 |
| b-6 | 128 | 10.5 | ≦10 | 78000 |

Examples b-1 to b-3, and Comparative Examples b-1 to b-3

By using the resin compositions obtained in Synthesis Examples, injection molding was carried out by means of a small-sized, simple injection molding machine to obtain a specimen of the rectangular test piece, having a size of 35 mm×65 mm, and a thickness of 3 mm.

The results of evaluation on the appearance and the light transmittance at 400 nm, as measured by an ultraviolet-visible spectrophotometer, of each rectangular test piece are shown in the following Table.

TABLE 2

| Example No./Comparative Example No. | Polymer Synthesis Example | Appearance | Light Transmittance (%) at 400 nm |
|---|---|---|---|
| Example b-1 | b-5 | Some shrinkage holes observed | 86% |
| Example b-2 | b-4 | Good | 88% |
| Example b-3 | b-6 | Good | 89% |
| Comparative Example b-1 | b-2 | Some shrinkage holes observed | 84% |
| Comparative Example b-2 | b-1 | Good | 82% |
| Comparative Example b-3 | b-3 | Yellowed | 76% |

Further, when the cycloolefin resin composition (A) was hydrogenated by passing it through a fixed bed reactor including a hydrogenation catalyst, instead of conducting the hydrogenating step as in the present Example, the same results as above were obtained. When the cycloolefin resin composition (A) was hydrogenated, and then the resin composition (B) after hydrogenation was flash dried at a temperature at which no solidification of the cycloolefin polymer will take place in a double pipe flash drying method, instead of conducting the drying step in the present Example, the same results as above were obtained.

The invention claimed is:
1. A cycloolefin resin composition (C) comprising:
a cycloolefin polymer consisting of one or two or more kinds of the structures represented by the general formula (5):

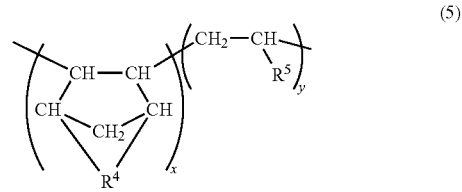

wherein R$^4$ is a di-valent group represented by general formula (6):

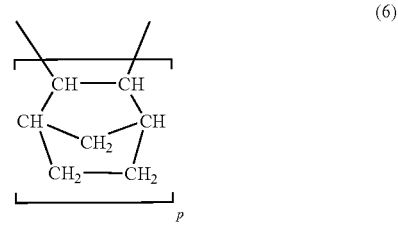

wherein p is an integer of 0 to 2, and a plurality of R$^4$'s, if any, may be the same or different from each other,
R$^5$ is a hydrogen atom or a mono-valent group selected from the group consisting of a hydrocarbon group having 1 to 5 carbon atoms, and a plurality of R$^5$'s, if any, may be the same as or different from each other, and
x and y each represents a copolymerization ratio, and are each a real number satisfying 5/95≦y/x≦95/5, with x and y being presented on a molar basis, and
a saturated hydrocarbon compound having a boiling point of 50° C. or higher wherein said resin composition (C) comprises 0.01 to 10 parts by weight of said saturated hydrocarbon compound having a boiling point of 50° C. or higher, per 100 parts by weight of said cycloolefin polymer, and wherein said saturated hydrocarbon compound having a boiling point of 50° C. or higher is a hydrogenation product of a monomer employed in the production of said cycloolefin polymer.

2. A molded product obtained by molding the cycloolefin resin composition (C) as claimed in claim 1.

3. A process for producing a cycloolefin resin composition (C), comprising:

preparing a cycloolefin resin composition (A) comprising a cycloolefin polymer consisting of one or two or more kinds of the structures represented by the general formula (2):

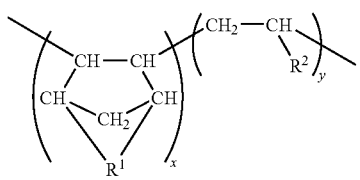

wherein $R^1$ is a di-valent group represented by general formula (3):

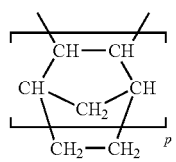

wherein p is an integer of 0 to 2, and a plurality of $R^1$'s, if any, may be the same or different from each other, $R^2$ is a hydrogen atom or a mono-valent group selected from the group consisting of a hydrocarbon group having 1 to 5 carbon atoms, and a plurality of $R^2$'s, if any, may be the same as or different from each other, and x and y each represents a copolymerization ratio, and are each a real number satisfying $5/95 \leqq y/x \leqq 95/5$, with x and y being presented on a molar basis, and an unsaturated hydrocarbon compound having a boiling point of 50° C. or higher and a solvent, wherein said cycloolefin resin composition (A) comprises 0.01 to 20 parts by weight of said unsaturated hydrocarbon compound having a boiling point of 50° C. or higher, per 100 parts by weight of said resin composition (A);

hydrogenating said unsaturated hydrocarbon compound having a boiling point of 50° C. or higher in said resin composition (A) in the presence of a hydrogenation catalyst to obtain a resin composition (B); and drying the cycloolefin resin composition to remove at least the solvent from said cycloolefin resin composition (B) comprising said cycloolefin polymer, a saturated hydrocarbon compound having a boiling point of 50° C. or higher and the solvent, wherein said removing the solvent comprises removing said solvent and a part of said saturated hydrocarbon compound having a boiling point of 50° C. or higher from said cycloolefin resin composition (B) to give a content of said saturated hydrocarbon compound having a boiling point of 50° C. or higher of 0.01 to 10 parts by weight, per 100 parts by weight of said cycloolefin polymer, and wherein said unsaturated hydrocarbon compound having a boiling point of 50° C. or higher is a monomer employed in the production of a cycloolefin polymer.

4. The process for producing a cycloolefin resin composition (C) as claimed in claim 3, wherein said removing the solvent comprises flash-drying said cycloolefin resin composition (B) at a temperature at which no solidification of said cycloolefin polymer will take place, in a double pipe flash drying method.

5. The process for producing a cycloolefin resin composition (C) as claimed in claim 3, wherein said cycloolefin resin composition (A) is a solution which said cycloolefin polymer and said unsaturated hydrocarbon compound having a boiling point of 50° C. or higher are dissolved in a hydrocarbon solvent.

6. The process for producing a cycloolefin resin composition (C) as claimed in claim 3, wherein said step of hydrogenating said unsaturated hydrocarbon compound having a boiling point of 50° C. or higher comprises passing said cycloolefin resin composition (A) through a fixed bed reactor containing a hydrogenation catalyst, to hydrogenate at least said unsaturated hydrocarbon compound having a boiling point of 50° C. or higher.

7. The process for producing a cycloolefin resin composition (C) as claimed in claim 3, further comprising treating said resin composition (A) with an adsorbent before and/or after said hydrogenating said unsaturated hydrocarbon compound having a boiling point of 50° C. or higher.

8. The process for producing a cycloolefin resin composition (C) as claimed in claim 3, further comprising removing a part of said unsaturated hydrocarbon compound having a boiling point of 50° C. or higher from said resin composition (A) before said hydrogenating said unsaturated hydrocarbon compound having a boiling point of 50° C. or higher.

* * * * *